US008988757B2

(12) United States Patent
Weidner

(10) Patent No.: US 8,988,757 B2
(45) Date of Patent: Mar. 24, 2015

(54) LOW VAPOR PRESSURE SOLVENT FOR ELECTROCHROMIC DEVICES

(75) Inventor: Arthur P. Weidner, Everett, WA (US)

(73) Assignee: The Boeing Company, Chicago, IL (US)

( * ) Notice: Subject to any disclaimer, the term of this patent is extended or adjusted under 35 U.S.C. 154(b) by 818 days.

(21) Appl. No.: 10/974,088

(22) Filed: Oct. 27, 2004

(65) Prior Publication Data

US 2005/0200933 A1 Sep. 15, 2005

Related U.S. Application Data

(60) Provisional application No. 60/552,453, filed on Mar. 12, 2004, provisional application No. 60/552,589, filed on Mar. 12, 2004, provisional application No. 60/552,606, filed on Mar. 12, 2004.

(51) Int. Cl.
G02F 1/15 (2006.01)
G02F 1/153 (2006.01)
B64C 1/14 (2006.01)
B64D 11/00 (2006.01)

(52) U.S. Cl.
CPC ............ G02F 1/1525 (2013.01); G02F 1/1523 (2013.01); G02F 2001/1519 (2013.01); G02F 1/1506 (2013.01); G02F 1/153 (2013.01); B64C 1/1484 (2013.01); B64D 2011/0061 (2013.01)
USPC .......................................... 359/273; 359/265

(58) Field of Classification Search
CPC ................ G02F 1/1523; G02F 1/1525; G02F 2001/1519; G02F 1/1506; G02F 1/153
USPC ................................................. 359/270, 265
See application file for complete search history.

(56) References Cited

U.S. PATENT DOCUMENTS

| | | | |
|---|---|---|---|
| 3,330,506 A | 7/1967 | Robillard et al. | 244/118.5 |
| 3,370,813 A | 2/1968 | Albertine et al. | 244/118.5 |
| 4,135,790 A | 1/1979 | Takahashi et al. | 359/275 |
| 4,214,820 A | 7/1980 | Leibowitz et al. | |
| 4,229,080 A | 10/1980 | Take et al. | |
| 4,286,308 A | 8/1981 | Wolff | |
| 4,893,908 A | 1/1990 | Wolf et al. | |
| 4,993,810 A | 2/1991 | Demiryont | 359/265 |
| 5,042,923 A | 8/1991 | Wolf et al. | 359/275 |
| 5,069,535 A | 12/1991 | Baucke et al. | |
| 5,097,358 A | 3/1992 | Ito et al. | |
| 5,108,048 A | 4/1992 | Chang | 244/118.1 |
| 5,347,434 A | 9/1994 | Drake | 362/472 |
| 5,384,653 A | 1/1995 | Benson et al. | |
| 5,457,564 A | 10/1995 | Leventis et al. | 359/271 |

(Continued)

OTHER PUBLICATIONS

Xu et al., Enhanced Smart Window Based Electrochromic Polymers, Smart Structures and Materials 2003; Electroactive Polymer Actuators and Devices (EAPAD), edited by Bar-Cohen, Y., Proceedings of the SPIE, vol. 5051, pp. 404-411 (Jul. 2003).

(Continued)

Primary Examiner — Zachary Wilkes

(57) ABSTRACT

The present invention provides an electrolyte for electrochromic devices, the substance comprising γ-butyrolactone (gamma-butyrolactone or GBL). The electrolyte may include polymethylmethacrylate. The electrolyte may further include a salt, such as a salt that includes lithium perchlorate or trifluorosulfonimide. In accordance with further aspects to the invention, the electrolyte may include propylene carbonate.

17 Claims, 13 Drawing Sheets

(56) References Cited

U.S. PATENT DOCUMENTS

| | | | |
|---|---|---|---|
| 5,598,293 | A | 1/1997 | Green .......................... 359/275 |
| 5,642,022 | A | 6/1997 | Sanz et al. |
| 5,654,786 | A | 8/1997 | Bylander |
| 5,699,192 | A | 12/1997 | Van Dine et al. ............. 359/269 |
| 5,724,176 | A | 3/1998 | Nishikitani et al. .......... 359/271 |
| 5,729,379 | A * | 3/1998 | Allemand et al. ............ 359/270 |
| 5,750,282 | A * | 5/1998 | Chi et al. ........................ 429/49 |
| 5,764,402 | A | 6/1998 | Thomas et al. |
| 5,805,330 | A | 9/1998 | Byker et al. |
| 5,838,483 | A | 11/1998 | Teowee et al. |
| 5,878,809 | A | 3/1999 | Heinle |
| 5,883,220 | A | 3/1999 | Armand et al. ............... 528/322 |
| 5,888,431 | A | 3/1999 | Tonar et al. .................. 252/583 |
| 5,923,456 | A * | 7/1999 | Tench et al. .................. 359/266 |
| 6,005,705 | A | 12/1999 | Schmidt et al. ............... 359/265 |
| 6,011,642 | A | 1/2000 | Vink et al. .................... 359/273 |
| 6,023,364 | A * | 2/2000 | Kobayashi et al. ........... 359/265 |
| 6,056,410 | A | 5/2000 | Hoekstra et al. |
| 6,130,772 | A | 10/2000 | Cava |
| 6,136,161 | A | 10/2000 | Yu et al. .................... 204/192.29 |
| 6,178,034 | B1 | 1/2001 | Allemand et al. |
| 6,197,923 | B1 | 3/2001 | Yamamoto .................... 528/424 |
| 6,222,177 | B1 | 4/2001 | Bechtel et al. |
| 6,246,505 | B1 | 6/2001 | Teowee et al. |
| 6,280,882 | B1 * | 8/2001 | Vallee et al. .................. 429/303 |
| 6,296,973 | B1 * | 10/2001 | Michot et al. ................. 429/300 |
| 6,297,900 | B1 | 10/2001 | Tulloch et al. |
| 6,317,248 | B1 | 11/2001 | Agrawal et al. |
| 6,327,070 | B1 * | 12/2001 | Heuer et al. .................. 359/269 |
| 6,433,913 | B1 | 8/2002 | Bauer et al. |
| 6,471,360 | B2 | 10/2002 | Rukavina et al. |
| 6,493,128 | B1 * | 12/2002 | Agrawal et al. ............... 359/265 |
| 6,501,587 | B1 | 12/2002 | Ferraris et al. |
| 6,515,787 | B1 | 2/2003 | Westfall et al. |
| 6,535,126 | B2 | 3/2003 | Lin et al. ....................... 340/550 |
| 6,541,156 | B1 * | 4/2003 | Fuse et al. ................... 429/218.1 |
| 6,561,460 | B2 | 5/2003 | Rukavina et al. |
| 6,567,708 | B1 | 5/2003 | Bechtel et al. |
| 6,587,250 | B2 | 7/2003 | Armgarth et al. |
| 6,594,065 | B2 | 7/2003 | Byker et al. |
| 6,606,184 | B2 * | 8/2003 | Guarr et al. ................... 359/265 |
| 6,639,708 | B2 | 10/2003 | Elkadi et al. |
| 6,747,780 | B2 | 6/2004 | Xu et al. |
| 6,783,099 | B2 | 8/2004 | Rukavina et al. .......... 244/129.3 |
| 6,795,226 | B2 * | 9/2004 | Agrawal et al. ............... 359/265 |
| 6,819,367 | B1 | 11/2004 | Cava |
| 6,822,778 | B2 | 11/2004 | Westfall et al. |
| 6,843,068 | B1 | 1/2005 | Wacker |
| 6,848,653 | B2 | 2/2005 | Finke et al. .................. 244/118.5 |
| 6,954,300 | B2 * | 10/2005 | Varaprasad et al. .......... 359/273 |
| 7,001,868 | B2 | 2/2006 | Sawano |
| 7,256,923 | B2 * | 8/2007 | Liu et al. ....................... 359/265 |
| 7,300,166 | B2 | 11/2007 | Agrawal et al. |
| 7,390,336 | B2 * | 6/2008 | Vallee et al. .................. 29/623.5 |
| 2002/0044331 | A1 | 4/2002 | Agrawal et al. ............... 359/265 |
| 2002/0080290 | A1 | 6/2002 | Nihei |
| 2002/0118437 | A1 | 8/2002 | Rukavina et al. ............. 359/275 |
| 2002/0135881 | A1 | 9/2002 | Rukavina et al. ............. 359/609 |
| 2002/0196518 | A1 | 12/2002 | Xu et al. ........................ 359/245 |
| 2002/0196519 | A1 | 12/2002 | Elkadi et al. |
| 2003/0047457 | A1 | 3/2003 | Rukavina et al. ............. 205/122 |
| 2003/0072071 | A1 * | 4/2003 | Asano et al. .................. 359/265 |
| 2003/0174377 | A1 | 9/2003 | Reynolds et al. ............. 359/265 |
| 2003/0184692 | A1 | 10/2003 | Nagae |
| 2003/0192991 | A1 | 10/2003 | Rukavina et al. .......... 244/129.3 |
| 2003/0209893 | A1 | 11/2003 | Breed et al. |
| 2003/0233172 | A1 | 12/2003 | Granqvist et al. |
| 2004/0021928 | A1 | 2/2004 | Warner et al. |
| 2005/0068629 | A1 | 3/2005 | Fernando et al. |
| 2005/0200933 | A1 | 9/2005 | Weidner ........................ 359/265 |
| 2005/0200934 | A1 | 9/2005 | Callahan et al. .............. 359/265 |
| 2005/0200937 | A1 | 9/2005 | Weidner ........................ 359/275 |
| 2005/0270619 | A1 | 12/2005 | Johnson et al. ............... 359/265 |

OTHER PUBLICATIONS

Xu et al., Gel Electrolyte Candidates for Electrochromic Devices (ECD), Smart Structures and Materials 2004, Electroactive Polymer Actuators and Devices (EAPAD), edited by Bar-Cohen, Y., Proceedings of the SPIE, vol. 5385, pp. 319-325 (Jul. 2004).

Liu et al., Design of Smart Window based on Electrochromic Polymers: New Derivatives of 3,4-alkylenedioxythiophene, Electroactive Polymer Actuators and Devices (EAPAD), edited by Bar-Cohen, Y., Proceedings of the SPIE, vol. 5385, pp. 454-460 (Jul. 2004).

Bonsor, "How Smart Windows Work", retrieved on Jun. 14, 2006 at <<http//electronics.howstuffworks.com/smart-window.htm/printable>>, HowStuffWorks, Inc., pp. 1-9.

"Electrochromism", retrieved on Jun. 15, 2006 at <<http://en.wikipedia.org/w/index.php?title=Electrochromism&oldid=53466702>>, Wikipedia, The Free Encyclopedia, Wikimedia Foundation, Inc., May 16, 2006, 1 page.

"InspecTech Aero Service Acquires License From Research Frontiers to Produce SPD Aircraft Windows Which Save Energy, Reduce Costs of Operation, and Promote Passenger Comfort", retrieved on Jul. 15, 2006 at <<http://www. findarticles.com/p/articles/mi_m0EIN/is_2001_March_22/ai_72047362>>, Business wire, business, Airline and Aerospace Editors, Mar. 22, 2001, pp. 1-4.

Knight, "Smart Glass Blocks infrared when heat is on", retrieved on Aug. 9, 2004 at <<www.newscientist.com/article.ns?id=dm6256&print=true>>, pp. 1-2.

Sapp, et al.,"High Contrast Ratio and Fast-Switching Dual Polymer Electrochromic Devices", 1998, Chem. Mater, vol. 10, pp. 2101-2108.

Schwenderman, et al., "Combined Visible and Infrared Electrochromisrn Using Dual Polymer Devices", 2001, Advanced Materials vol. 13, No. 9, pp. 634-637.

"Smart windows", retrieved on Jun. 15, 2006 at <<http://em.wikipedia.org/w/index.php?title=Smart_windows&oldid=57591898>>, Jun. 8, 2006, 1 page.

Welsh, et al., "Enhanced Contrast Ratios and Rapid Switching in Electrochromics Based on Poly (3,4- propylenediozythiophene) Derivitives", Advanced Materials vol. 11, No. 16, 1379-1382.

* cited by examiner

LOW VAPOR PRESSURE SOLVENT FOR ELECTROCHROMIC DEVICES

CROSS REFERENCE TO RELATED APPLICATIONS

This patent application is related to commonly-owned U.S. patent application Ser. No. 10/974,251 entitled "Multi-Color Electrochromic Device", filed on Oct. 27, 2004 and issued as U.S. Pat. No. 7,450,294 on Nov. 11, 2008; to commonly-owned U.S. patent application Ser. No. 10/974.240 entitled "Dimming Control System for an Array of Electrochromic Devices", filed on Oct. 27, 2004, and published as U.S. 20050200934 on Sep. 15, 2005, now abandoned; and to U.S. Pat. No. 6,747,780, entitled "Electrochromic Organic Polymer Syntheses and Devices Utilizing Electrochromic Organic Polymers," Xu et al., issued Jun. 8, 2004; which applications are hereby incorporated by reference.

PRIORITY CLAIM

This non-provisional patent application claims priority from U.S. Provisional Application No. 60/552,453, filed on Mar. 12, 2004; from U.S. Provisional No. 60/552,606, filed on Mar. 12, 2004, which provisional applications are incorporated herein by reference.

PARTIES TO A JOINT RESEARCH AGREEMENT

The Boeing Company and the University of Washington are parties to a Joint Research Agreement.

FIELD OF THE INVENTION

This invention relates generally to electrochromic devices that exhibit different colors as a function of an applied voltage, and more specifically, to electrolytes for electrochromic devices.

BACKGROUND OF THE INVENTION

Electrochromic devices are often used as windows, shades, dividers, mirrors, or electronic displays, that change color or degree of opacity in respect to an applied electric field or current. Such an electrochromic device typically is a multi-layer assembly. Outer layers of the electrochromic device typically are electrodes that are optically clear [i.e. substantially transparent or translucent to light in wavelengths of the visual spectrum or at other desired wavelengths, albeit in some instances bearing a limited tint or color]. At least one electrochromic layer is sandwiched between the electrodes. This layer is able to change color or opacity in response to changes in the applied electric field or current to create visual effects. The electrochromic layer is often an organic polymer film or an inorganic thin film of an electrochromic material. When the voltage is applied across the outer conductors, ions in an electrolyte typically move to the electrochromic layer causing the electrochromic material to change color states. Reversing the voltage moves ions away from the electrochromic layer, restoring the device to its previous state.

An electrolyte is often used in an electrochromic device to act as a reservoir for the ions that activate the electrochromic layer and/or provide a medium for transporting ions between a separate ion reservoir material or counter-electrode and the electrochromic layer. A salt such as lithium perchlorate ($LiClO_4$) or trifluorosulfonimide ($LiN(CF_3SO_2)_2$) may be used to provide the ions to activate and deactivate the electrochromic layer. The salt is typically dissociated in a solvent in the electrolyte, freeing the ions for use in activating the electrochromic layer.

Gel electrolytes in electrochromic devices are often preferred because they are less likely to leak than liquids and more stable dimensionally. One gel electrolyte usable in a preferred electrochromic device includes a solid polymer matrix, especially of polymethylmethacrylate (PMMA).

It is desirable for the electrolyte to have high ionic conductivity, permitting the ions to move within the electrolyte, while having relatively low electric conductivity so that the electrochromic device does not short out. Prior art solvents for electrolytes for electrochromic devices include acetonitrile and/or ethylene carbonate. However, many of the solvents used for electrochromic devices have comparatively high vapor pressures and are comparatively volatile and thus can evaporate, and/or are unstable, have higher flammability, and/or have higher toxicity. Evaporation of a solvent in an electrolyte can change the electrolyte composition and degrade functionality of the electrochromic device.

SUMMARY OF THE INVENTION

The present invention provides an electrolyte for electrochromic devices, the electrolyte comprising γ-butyrolactone (gamma-butyrolactone or GBL). The electrolyte may further include polymethylmethacrylate. The electrolyte may further include a salt, such as a salt that includes lithium perchlorate and/or trifluorosulfonimide. In accordance with further aspects to the invention, the electrolyte may include propylene carbonate.

BRIEF DESCRIPTION OF THE DRAWINGS

Preferred and alternate embodiments of the present invention are described in detail below with reference to the following drawings.

DETAILED DESCRIPTION OF THE INVENTION

Detailed Description

The present invention relates to electrochromic devices. Many specific details of certain embodiments of the invention are set forth in the following description and in FIGS. 1-19 to provide a thorough understanding of such embodiments. One skilled in the art, however, will understand that the present invention may have additional embodiments, and that the present invention may be practiced without several of the details described in the following description.

Embodiments of the present invention may include a γ-butyrolactone (gamma-butyrolactone or GBL) bearing electrolyte for electrochromic panels. In one embodiment, a GBL electrolyte exhibits high ionic conductivity, high transmittance of light, and stability over time and temperature. These features are useful, for example, in aircraft applications such as electrochromic shades for aircraft windows, replacing hand pulled window shades.

This application incorporates by this reference Xu et al., *Electrochromic Organic Polymer Synthesis and Devices using Electrochromic Organic Polymers*, U.S. Pat. No. 6,747,780 B2, issued Jun. 8, 2004; Xu, C., Liu, L., Legniski, S., Le Guilly, M., Taya, M., Weidner, A., *Enhanced Smart Window Based on Electrochromic Polymers*, Smart Structures and Materials 2003: Electroactive Polymer Actuators and Devices (EAPAD), edited by Bar-Cohen, Y., Proceedings of the SPIE, Volume 5051, pp. 404-411 (July, 2003) (hereinafter "Reference A"); Xu, C., Liu, L., Legniski, S., Le Guilly, M., Taya, M, *Gel Electrolyte Candidates for Electrochromic Devices (ECD)*, Smart Structures and Materials 2004, Electroactive Polymer Actuators and Devices (EAPAD), edited by Bar-Cohen, Y., Proceedings of the SPIE, Volume 5385, pp. 319-325 (July, 2004) (hereinafter "Reference B"); and Liu, L., Xu, C., Legniski, S., Ning, D., M., Taya, M, *Design of Smart Window based on Electrochromic Polymers: New Derivatives of 3,4-alkylenedioxythiophene*, Electroactive Polymer Actuators and Devices (EAPAD), edited by Bar-Cohen, Y., Proceedings of the SPIE, Volume 5385, pp. 454-460 (July, 2004) (hereinafter "Reference C").

Figure 1:
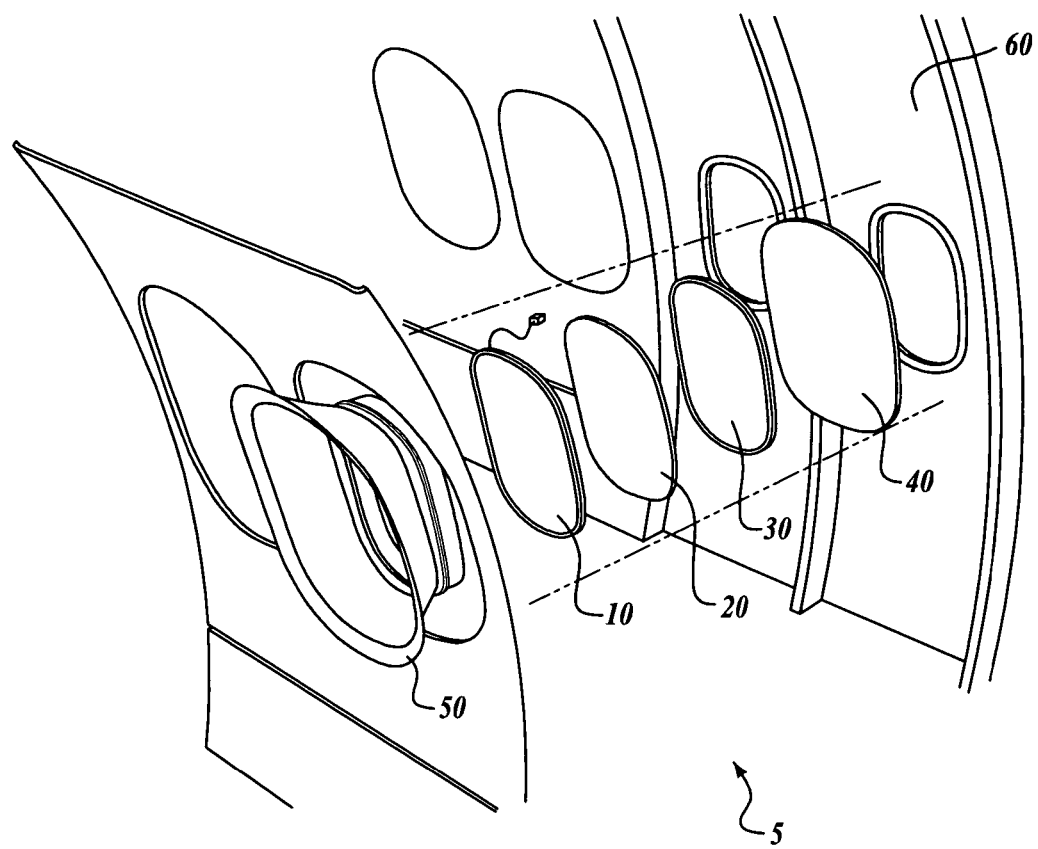
FIG. 1 is an exploded isometric view of an aircraft window incorporating an electrochromic device.

FIG. 1 is an exploded view of an exemplary electrochromic device used as an aircraft window shade 5 in accordance with an embodiment of the present invention. A structural window 40 is installed in an aircraft fuselage wall 60 with a seal 30. Inboard of the structural window 40 is a safety backup pane 20. An electrochromic shade 10 is held in place between the safety pane 20 and an aircraft interior window molding 50 surrounding the window on the interior of the aircraft. When the electrochromic shade 10 is activated, it changes color and/or opacity states, typically either dimming or brightening the aircraft interior by controlling entry of light from outside the aircraft.

Figure 2A:
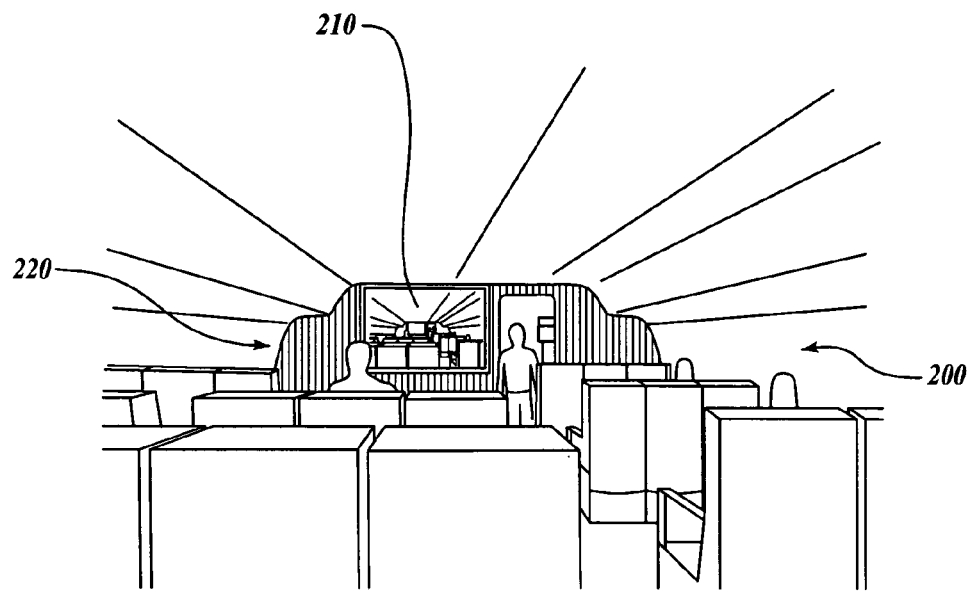
FIG. 2A is a perspective view of an aircraft interior incorporating a multi-color electrochromic device (shown in an inactivated transparent state) as a compartment divider.

Turning to FIG. 2A, a multi-color electrochromic panel 210 in accordance with an embodiment of the invention is shown positioned as a part of a cabin compartment divider 220 in the interior 200 of a passenger aircraft. In FIG. 2A, the panel 210 is shown in the non-activated state, where it is substantially transparent, permitting viewing through the panel 210. The multi-color electrochromic panel 210 is held by, and forms a part of, the passenger compartment divider 220 that divides different segments of the passenger compartment from each other. When the electrochromic display 210 is substantially transparent as shown in FIG. 2A, viewing is permitted through the divider 220. In vehicular applications, for example, viewing through the divider 220 may be desirable for loading and unloading purposes, regulatory, or safety reasons.

In some embodiments, a control panel may be programmed to change the opacity of the electrochromic display 210 to change the environment based upon time of day, the status of the flight (take-off, landing, etc.), or other criteria. Alternately, the electrochromic display 210 may be programmed to change state when a sufficient amount brightness level is sensed within the cabin. An exemplary display 210 in a vehicle or any other environment may thus change with time, at certain times, or during certain events. The display 210 may thus adjust the natural lighting in the interior 200 of the aircraft, or any other vehicle or architectural environment. The display 210 may also be used in a combination with a window, in addition to forming a divider 220.

Figure 2B:
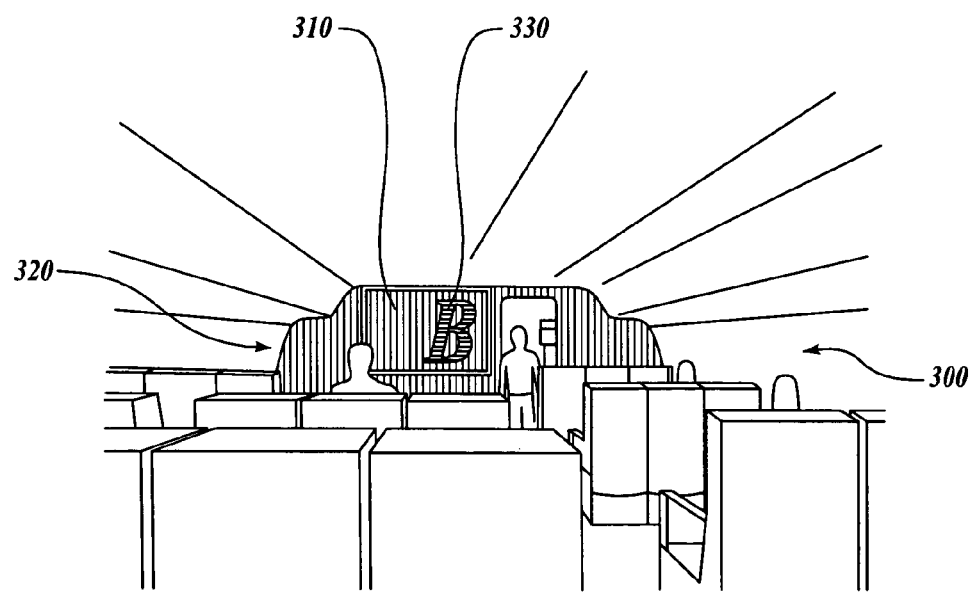
FIG. 2B is a perspective view of an aircraft interior incorporating a multi-color electrochromic device exhibiting a logo (shown in an activated colored state).

FIG. 2B shows a passenger aircraft cabin interior 300 similar to that in FIG. 8A. An embodiment of a multi-color electrochromic panel 310 is installed in the cabin interior 300 as a part of a cabin compartment divider 320. In FIG. 2B, the panel 310 is shown in the activated state exhibiting a multi-color logo 330. In an activated state, the panel 310 displays the logo 330, and passengers cannot see through the panel 310, visually dividing the passenger compartments. In a non-activated state, the multi-color logo 330 disappears and the panel 310 is transparent, in the manner shown in FIG. 2A.

Figure 3A:
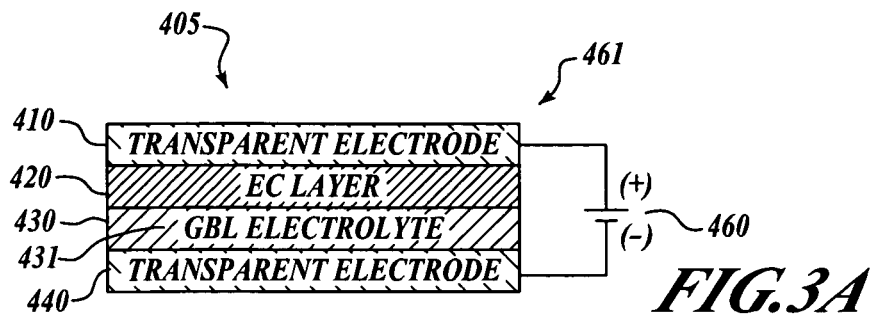
FIG. 3A is an exemplary electrochromic device incorporating an exemplary γ-butyrolactone (gamma-butyrolactone or GBL) electrolyte in a deactivated state.

FIG. 3A shows an exemplary electrochromic device 405 in cross-section in accordance with an embodiment of the invention in a deactivated state 461. The device 405 includes a first transparent electrode 410 and a second transparent electrode 440. Disposed between the first electrode 410 and the second electrode 440, and adjacent to the first electrode 410 is an electrochromic layer 420. The electrochromic layer 420 in this example changes color or darkens when it is in a reduced state. By way of example, but not limitation, the electrochromic layers may include a polymer film such as poly[3,3-dimethyl-3,4-dihydro-2H-thieno[3,4-b][1,4]dioxepine] (PProDOT-(CH$_3$)$_2$).

As further shown in FIG. 3A, positioned between the electrochromic layer 420 and the second electrode 440 is an electrolyte layer 430 including an embodiment of a γ-butyrolactone (gamma-butyrolactone or GBL) gel electrolyte (GBL electrolyte) 431. The GBL electrolyte 431 may include GBL and a salt that when dissociated activates the electrochromic layer 420 with the application of an electric field. GBL ($C_4H_6O_2$) is an essentially colorless cyclic ester with a comparatively low vapor pressure capable of performing as a solvent for the salt. Depending upon the desired application, other known electrolytes suitably may be included in the electrolyte layer 430.

An electric field (not shown) is applied to the electrochromic layer 420 and the GBL electrolyte 431 to activate and deactivate the electrochromic layer 420. In this embodiment, the electric field is provided by an electrical power source 460 connected to the first electrode 410 and the second electrode 440. The first electrode 410 and the second electrode 440 may suitably include glass, acrylic or polycarbonate coated with Indium Tin Oxide (ITO) to form transparent sheet electrodes. Other transparent materials, other electrode materials, and other configurations including small scale printed circuitry grids may suitably be substituted for ITO coated transparent electrodes. In FIG. 3A, the first electrode 410 is connected to the positive pole of the voltage source 460 and the second electrode 440 is connected to the negative pole of the electrical source 460. As further described with reference to FIGS. 4A and 4B, in this configuration, with a positive charge applied to the first electrode 410, the electrochromic layer 420 becomes deactivated and substantially transparent. The first electrode 410, the second electrode 440, and the GBL electrolyte 431 are also substantially transparent, and thus the electrochromic device 405 in this state as a whole is substantially transparent.

The term transparent or colorless should not be limited to mean perfectly transparent (i.e. 100% transmissive) or perfectly colorless, but rather, should be read to include conditions of partial or imperfect transmissivity or substantial translucence. The terms transparent or colorless include being substantially optically clear and transmissive in the visual color frequencies of light, like ordinary glass, or having the property of transmitting visual light (or other desired frequencies, as desired) so that objects lying beyond are visible.

Figure 3B:
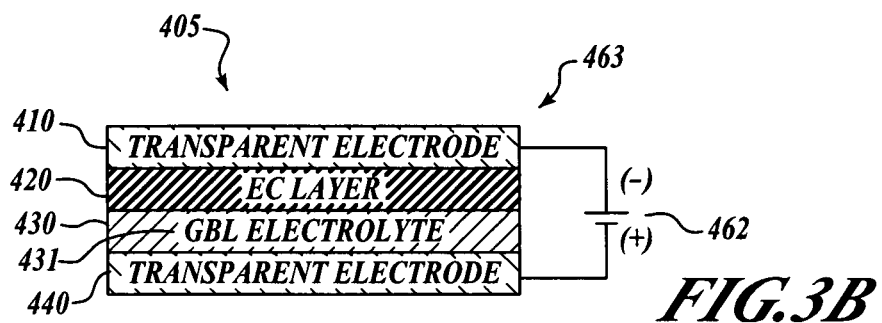
FIG. 3B is an exemplary electrochromic device including an exemplary GBL electrolyte in an activated state.

In FIG. 3B, the electrochromic device 405 of FIG. 3A is connected to a reversed electrical source 462. The negative pole of the reversed electrical source 462 is connected to the first electrode 410, and the positive pole of the reverse electrical source 462 is connected to the second electrode 40. In this configuration, the electrochromic layer 420 changes to an activated state 463, substantially darkens, and thus is no longer substantially transparent. As described with reference to FIGS. 4A and 4B, the reversed electric field (not shown) provided by the reversed electrical source 462 draws positive ions (not shown) from the GBL electrolyte 431 into interaction with the electrochromic layer 420, thereby activating the electrochromic layer 420. In many electrochromic devices, it is not necessary to maintain the electric field or the reversed electric field to maintain the color or transparency of the device, only to change the color state or transparency.

Figure 4A:
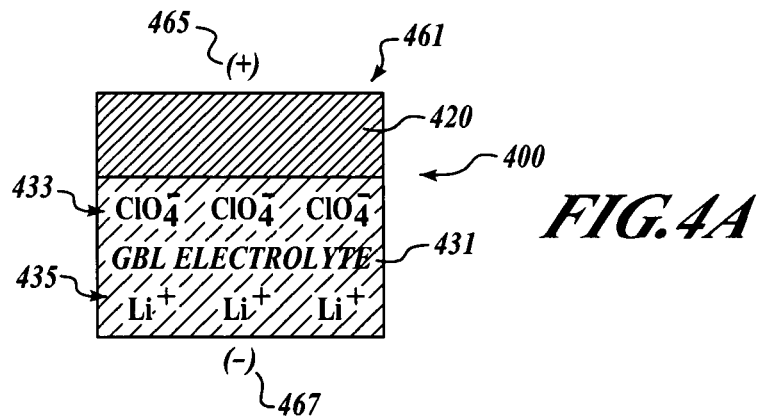
FIG. 4A is an enlargement of an exemplary interface between an electrochromic layer and an exemplary GBL electrolyte, with the electrochromic layer in a deactivated state.
Figure 4B:
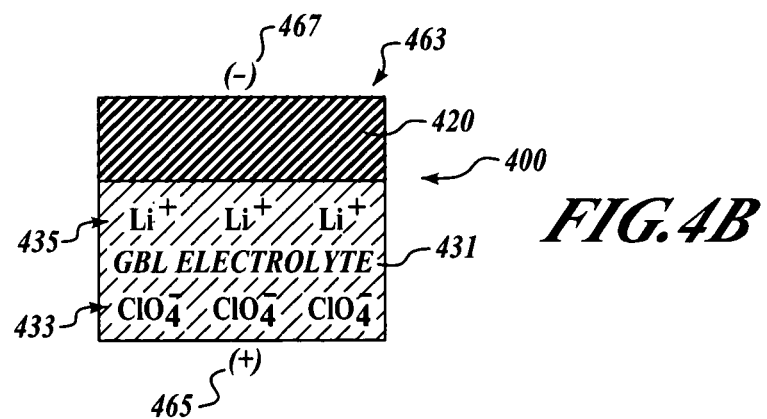
FIG. 4B is an enlargement of an exemplary interface between an electrochromic layer and an exemplary GBL electrolyte, with the electrochromic layer in an activated state.

FIGS. 4A and 4B are enlarged symbolic diagrams of an exemplary interface 400 such as in FIGS. 3A and 3B, between an electrochromic layer 420 and a GBL-bearing gel electrolyte 431 (GBL electrolyte), with the electrochromic layer 420 in a one of its operative states 461 in FIG. 4A, and in a second operative state 463 in FIG. 4B. In this embodiment, the GBL electrolyte 431 includes a lithium perchlorate salt that dissociates in the GBL bearing electrolyte 430 into perchlorate ions 433 and lithium ions 435. The GBL acts as a solvent dissociating the lithium perchlorate salt into its component ions. As shown in FIG. 4A, while not intending to be bound by theory, in the presence of an electric field, with a positive pole 465 adjacent to and outside of the electrochromic layer 420 side of the interface 400, and a negative pole 467 adjacent to and outside of the GBL electrolyte 431 side of the interface 400, the perchlorate ions 433 in the GBL electrolyte 431 are drawn toward the electrochromic layer 420. This permits the electrochromic layer 420 to gain or maintain an oxidized state, and thus gain or maintain a substantially transparent or non-activated state. Alternately, the lithium ions 435 in the GBL electrolyte 431 are drawn away from the electrochromic layer 420 (towards the negative pole 467), and thus do not activate the electrochromic layer 420.

In FIG. 4B, the electric field is reversed from that in FIG. 2A. The negative pole 467 is adjacent to and outside of the electrochromic layer 420, and the positive pole 465 is adjacent to and outside of the GBL electrolyte 431. In this configuration, and again while not intending to be bound by theory, the interface 400 has lithium ions 435 drawn toward the electrochromic layer 420, or towards the negative pole 467 of the electric field, activating the electrochromic layer 420, changing its color state, in this instance substantially darkening it. An electrochromic layer 420 that is activated (in this example in a reduced state) when it forms or is adjacent a cathode or the negative pole of an electric field is a cathodic electrochromic layer. Electrochromic layers may also be anodic, and thus are activated when they form or are adjacent the anode or positive pole of an applied electric field. A GBL electrolyte 431 of the present invention may be used with both cathodic and anodic electrochromic layers.

A GBL electrolyte 431 advantageously dissociates and carries the lithium ions 435 and the perchlorate ions 433 while having a comparatively low vapor pressure, and comparatively low toxicity and low flammability as compared to other electrolytes. The GBL in a GBL electrolyte 431 acts as a solvent, disassociating the lithium perchlorate, triflourosulfonimide, another suitable salt, or mixtures thereof to allow ions to activate the electrochromic layer. A gelled GBL electrolyte 431 includes an effective amount of polymethylmethacrylate or other suitable colorless gelling agent. The GBL may also be mixed with one or more additional solvents such as ethylene carbonate, propylene carbonate, other higher molecular weight cyclic esters, or other suitable compounds that are essentially colorless, comparatively non-toxic, and have comparatively low volatility.

By way of example, but not limitation, propylene carbonate as a second solvent may suitably be mixed with GBL in a GBL-bearing electrolyte 130. In another embodiment, a suitable GBL-bearing electrolyte 130 includes approximately 70% by weight GBL, 20% by weight propylene carbonate, 3% by weight lithium perchlorate, and 7% by weight polymethylmethacrylate. The weight percentages of the components of this embodiment can vary and still maintain functionality. In some embodiments, the propylene carbonate percentage may be reduced to near 0%, resulting in decreased volatility, but typically higher cost as GBL typically is more expensive than propylene carbonate. Alternately, the weight percentage of propylene carbonate also may be increased to over 20% maintaining functionality, but increasing volatility. Additional quantities of lithium perchlorate may provide additional ions beyond those used in the electrochromic reactions, but typically do not otherwise affect functionality. Considerably smaller weight percentages of lithium perchlorate may decrease color changes in the electrochromic layer. In an alternate embodiment, for example, lithium perchlorate may be substituted or supplemented with the salt trifluorosulfonimide at approximately 3% by weight.

The weight percentage of polymethylmethacrylate may also vary, affecting the viscosity of the GBL-bearing electrolyte 130, but not otherwise affecting the functionality of the electrolyte. Some electrochromic devises use essentially liquid electrolytes with little gelling material or polymethylmethacrylate. Considerably larger quantities of polymethylmethacrylate may cause cloudiness in the electrochromic device.

GBL has a vapor pressure of approximately 1.5 mm of Hg at 20° C. Compared to higher vapor pressure solvents such as acetonitrile (ACN) with a vapor pressure of 72.8 mm of Hg at 20 C., GBL suitably has lower rates of diffusion and evaporation from electrochromic devices. GBL suitably exhibits high ionic conductivity, high transmittance of light, and stability over time and temperature. The low viscosity of the GBL provides an ionic environment that facilitates high ionic mobility of the salts activating and deactivating the electrochromic layer. In an example embodiment of a GBL bearing electrolyte 130, an electronic grade GBL is used and the GBL is dried over molecular sieves to remove any residual water.

GBL may suitably have a high ionic conductivity, resulting in a low activation energy facilitating ionic movement. The activation energy for an exemplary gel electrolyte, including GBL, propylene carbonate, lithium perchlorate, and polymethylmethacrylate are approximately 9.7 kJ/mol. ACN as an electrolyte, by way of comparison, has an activation energy of 83 kJ/mol.

Figure 5:
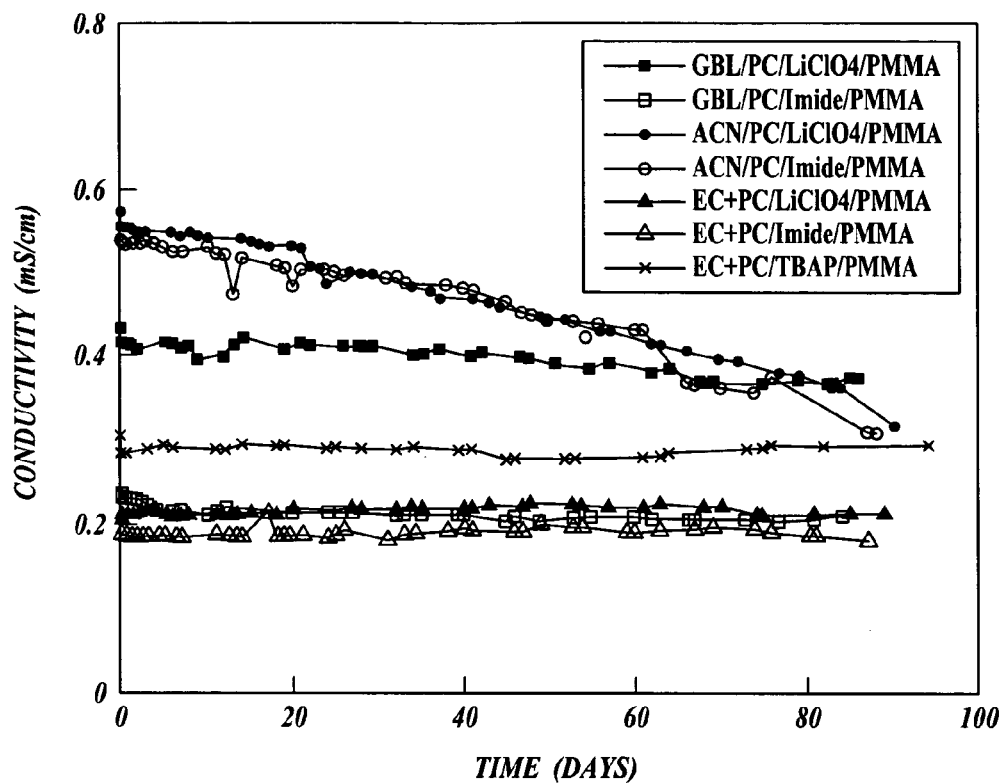
FIG. 5 is a chart of ionic conductivity of exemplary gel electrolytes over time.

As shown in FIG. 5, an exemplary GBL-bearing electrolyte over time exhibits a stable comparatively high ionic conductivity. As shown in FIG. 3, ACN bearing electrolytes exhibit a high initial conductivity (mS/cm), but their ionic conductivity declines over a course of 90 days. Exemplary GBL gel electrolytes including lithium perchlorate exhibit a slightly lower ionic conductivity, but exhibit stable ionic conductivity over 100 days. Thus, a GBL-bearing electrolyte 130 of the present invention suitably provides stable ionic conductivity over time, and thus may increase the lifetime of an electrochromic device.

Figure 6:
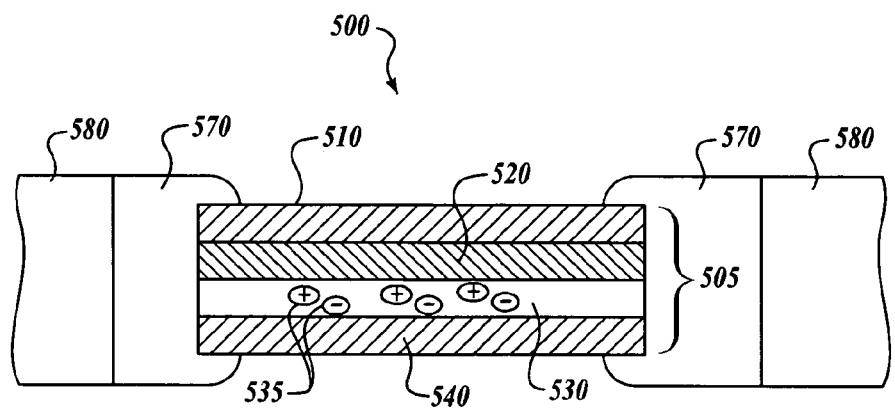
FIG. 6 is a cross-section of an exemplary electrochromic aircraft window incorporating an exemplary GBL electrolyte.

FIG. 6 shows a cross section of an electrochromic device used as a window or shade 500 installed in an aircraft fuselage 580. The window 500 includes a GBL electrolyte 530 that suitably provides comparatively low flammability and toxicity for aircraft or automotive applications. The window 500 is a multi-layer assembly 505, including a first electrode 510, an electrochromic layer 520, a GBL electrolyte 530, and a second electrode 540. The assembly 505 is suitably held in a frame 570, in this example, adapted to hold the electrochromic window 500 in the wall of an aircraft fuselage 580. A GBL electrolyte 530 bearing electrochromic window 500 suitably provides ionic conductivity and stability, while complying with appropriate safety limitations for an aircraft application. The GBL electrolyte 530 suitably permits the salt ions 535 within the GBL electrolyte 530 to activate and deactivate electrochromic layer 520 in an aircraft environment through multiple cycles. Structural window layers may be added to the window 500, leaving the window 500 to serve as a shade.

Figure 7:
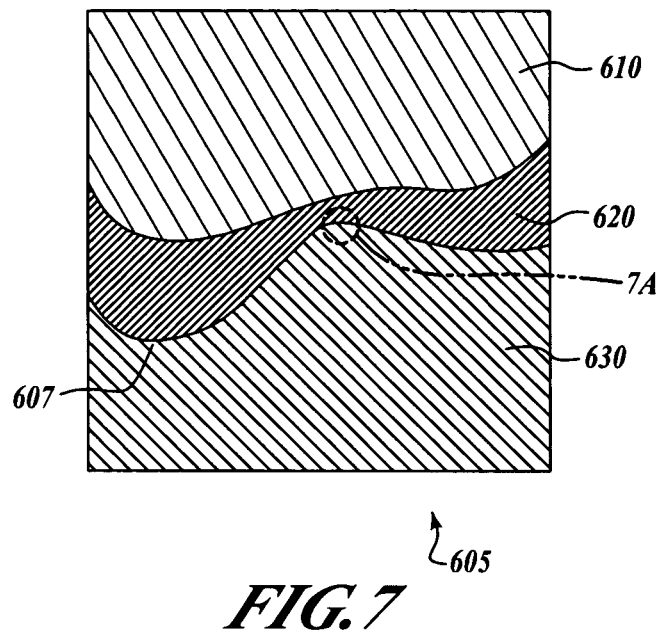
FIG. 7 is a plan view of an exemplary multi-color electrochromic panel exhibiting a pattern.

Electrochromic devices of the present invention may also include multi-color electrochromic panels, i.e., polychromatic, having at least two pigments of electrochromic materials. For example, FIG. 7 shows an exemplary multi-color electrochromic panel 605 in accordance with an embodiment of the present invention. The panel 605 includes three color zones, a first color zone 610, a second color zone 620, and a third color zone 630 arranged in the panel 605 in a design or pattern 607. Alternate color panels 605 suitably may have only one color zone, or a greater number of color zones. The pattern 607 in this embodiment is a colored wave pattern adapted to match or complement other designs, architectural features, patterns or colors in an area (not shown) where the panel 605 is installed, such as described further with reference to FIG. 10. The electrochromic device 605 is shown with the electrochromic layer activated to be in an opaque or colored state, as opposed to a substantially transparent state. In a non-activated state, this exemplary panel 605 would be substantially transparent, i.e., the zones 610, 620, and 630 would all be substantially transparent, and the pattern 607 would not be visible. In some embodiments, the pattern 607 may still permit an observer to see partially, or dimly, through the panel 605, even when the panel 605 is in a fully activated state.

Figure 7A:
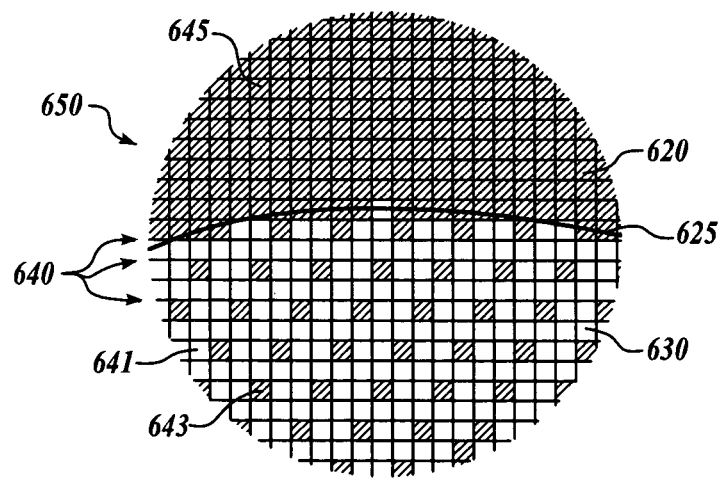
FIG. 7A is an enlarged view of a section of the electrochromic panel of FIG. 7 showing exemplary interspersed pixels of a multi-color electrochromic layer.

FIG. 7A shows an enlargement of a typical section of an electrochromic layer 650 at an interface 625 between the second color zone 620, and third color zone 630 of the panel 605 of FIG. 7 at a pixel level. The electrochromic layer 650 is divided into a plurality of pixels 640. In this example, the pixels 640 are a uniform size and shape, are square and are of a size such that when viewed from ordinary human viewing distances of approximately two feet or greater, the pixels 640 blend to form colors. The colors formed are based upon the respective areal color densities or percentages of different colors of electrochromic materials in the pixels 640. In this example, the pixels 640 include varying densities of three colors of electrochromic material, a first color electrochromic material 641, a second color electrochromic material 643, and a third color electrochromic material 645. In this embodiment, the second color zone 620 of the panel 605 of FIG. 7 is composed of pixels of the third color electrochromic material 645, while the third color zone 630 is composed of a mixture of pixels of the first color electrochromic material 641 and the second color electrochromic material 643. By varying the areal percentage or density of pixels 640 of color electrochromic materials 641, 643, and 645, a wide variety and gradations of colors may be generated from the visual mixing of the pixels 640. When viewed by the human eye from normal viewing distances, pixels 640 of the first color electrochromic material 641, the second color electrochromic material 643, and the third color electrochromic material 645 blend into a desired configuration of varied and graduated colors. Suitable pixel sizes for partial wall size multi-color electrochromic panels 605 include pixels approximately one millimeter square. In single color areas intended to display an unmixed color of an electrochromic material, such areas may have much larger pixels or be aggregated into a single area wide "pixel."

By way of example, but not limitation, electrochromic materials when activated can form various colors that can be mixed visually in a multi-color electrochromic panel 605 as described with reference to FIG. 7 and FIG. 7A. For example, 3,3-Dimethyl-3,4-dihydro-2H-thieno[3,4-b][1,4]dioxepine (1) forms a blue color when activated in a reduced state, and otherwise is substantially transparent. Similarly, 6,6-dimethyl-6,7-dihydro-2H,5H-4,8-dioxa-2-aza-azulene (2) in an activated or reduced state forms a red color and is otherwise substantially transparent. Other colors of electrochromic materials are available and/or under development. Red and blue color electrochromic materials may be combined in various ratios to produce reds, blues, and purples. Red, blue, and green pixels will be able to be combined to form a very wide pallet of colors, as may cyan, magenta, and yellow electrochromic materials.

Overlapping of colors, either on a substrate or in a multiple-activated-layer sandwich, may also produce further colors or variable colors as each or multiple color layers are activated (see, e.g., Reference C). By way of example, red, purple, blue, substantially transparent, and black colors suitably may be displayed by activating one or both of the red and blue electrochromic materials to varying intensities either together, separately, or not at all, with a combination of red or blue electrochromic materials. Alternately, applying a segmented activating charge to a display 605, thus providing different charge regimes to differing subsets and combination of pixels 640 or sections of the display 605, similarly will also produce a variety of combinations of colors, transparency, and opacity, from the display 405 at different times.

Figure 8:
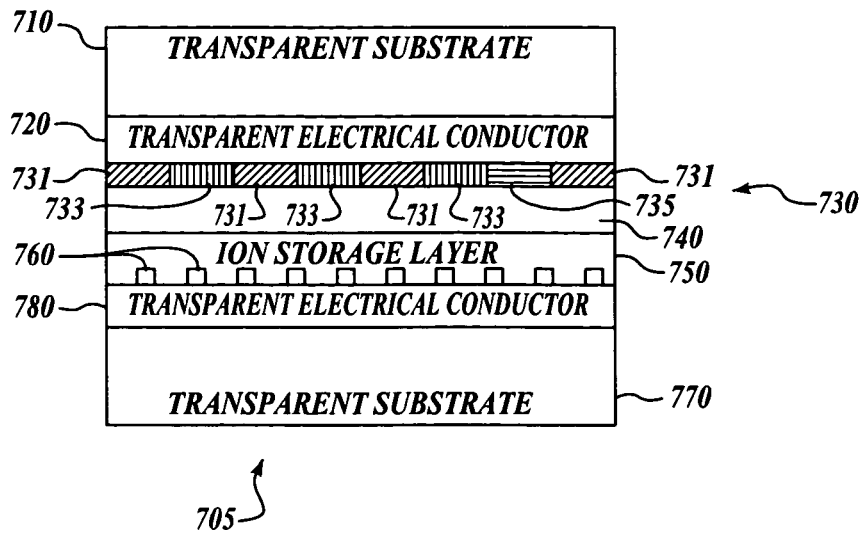
FIG. 8 is a cross-section of an exemplary multi-color electrochromic device.

FIG. 8 shows a cross-section of an exemplary single electrochromic layer multi-color electrochromic panel 705. The panel 705 has a first transparent substrate 710, upon which is deposited a transparent electrical conductor 720. Deposited on the transparent electrical conductor 720 is an electrochromic layer 730 including areas of a first color electrochromic material 731, areas of a second color electrochromic material 733, and areas of a third color electrochromic material 735. The transparent electrical conductor 720 permits an electrical charge or field to be applied to the color electrochromic materials 731, 733, and 735. As described above, the areas of the first material 731, the second material 733, and the third material 735 are suitably small enough that when activated and viewed from normal viewing distance the colors blend visually to form different areas on the panel 705 where different colors may be displayed. Adjacent to the electrochromic layer 730 is a gel electrolyte layer 740 that conducts, and to some degree stores, ions that activate and deactivate the electrochromic layer 730. In some embodiments of the present invention, the gel electrolyte includes GBL.

The example panel 705 may also incorporate an ion storage layer 750 with a conductor grid 760 that, in some embodiments, comprises a grid including gold (Au). The ion storage layer 750 suitably attracts and stores the oppositely charged counterparts to the ions activating and deactivating the electrochromic layer 730.

In operation, an electrical charge may be provided to the ion storage layer 750 and the grid 760 by a second transparent electrical conductor 780 mounted on a second transparent substrate 770.

Figure 9:
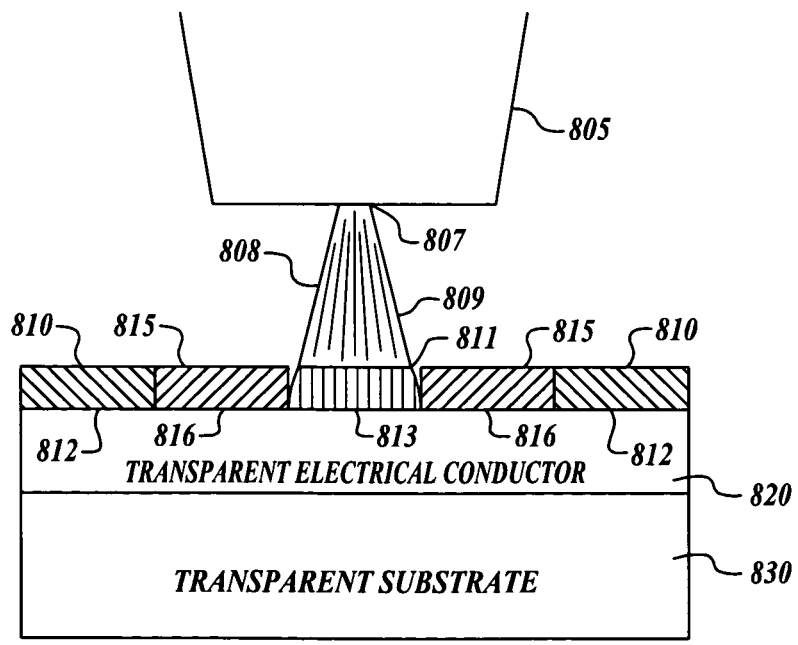
FIG. 9 is a cross-section of deposition of a multi-color electrochromic layer on a substrate.

In FIG. 9 a colored electrochromic material 811 is deposited onto a transparent electrical conductor 820 on a transparent substrate 830, during preparation of an exemplary multi-color electrochromic layer. Masks 810 and 815 cover separate, selected portions 812 and 816, respectively of the conductor 820. A third portion of the conductor 813 is unmasked, permitting a jet 809 of electrochromic material 808 (e.g. unpolymerized electrochromic material) to be jetted from a nozzle 807 of a spray device 805. The first mask 810 and the second mask 815 may subsequently be removed, and the spray device 805 used to direct a jet of alternate color electrochromic materials (not shown) onto the transparent electrical conductor 820 in the previously masked portions 812 and 816 of the conductor 820. Suitable masking materials include, for example, ablative masking materials such as polyimide.

In this embodiment, when the jet 809 of electrochromic material 808 is sprayed toward the unmasked portion 813 of the transparent electrical conductor 820, the electrochromic materials 808 is electropolymerized by an electrical charge applied to the conductor 820. At the time of spraying, the materials 808 polymerize on contact with the charged conductor 820. Alternately, for example, a separate screen mask may be used in lieu of ablative or removable masking materials 810 and 815. Furthermore, in alternate embodiments, with a defined delivery quantity and a shaped jet 808, different areas of the transparent electrical conductor 820 may be coated with a colored electrochromic material without utilizing a separate mask.

Figure 10:
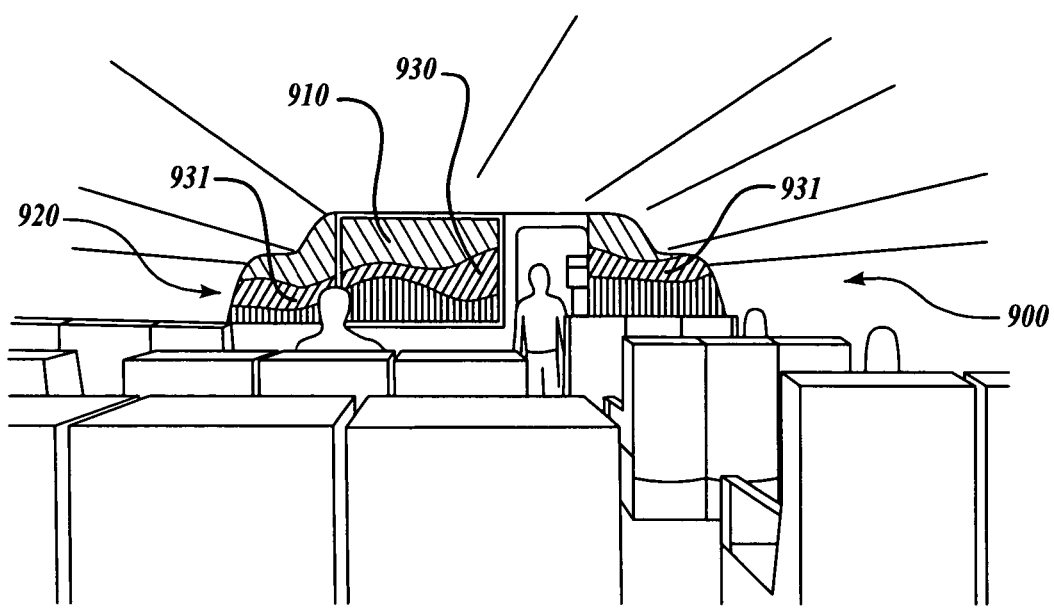
FIG. 10 is a perspective view of an aircraft interior incorporating a multi-color electrochromic device exhibiting a pattern (shown in an activated colored state).

FIG. 10 shows an exemplary aircraft interior 900 similar to that shown in FIGS. 2A and 2B, with a multi-color electrochromic panel 910 installed in a passenger compartment divider 920. In this embodiment, the panel 910, when activated (as shown here) displays a color coordinated interior design or pattern 930 that may be coordinated with and visually match other portions of the compartment divider 920, which may have a similar, but non-electrochromic interior design or pattern 931. When the electrochromic panel 910 is in a non-activated state the panel 910 is substantially transparent. Multi-color panels 910, such as that shown in FIG. 10, suitably may have color patterns to match a wide variety of architectural details, designs, patterns, and colors and be used in vehicles, buildings, signs, or the like.

Additional embodiments of the present invention include systems and methods for controlling arrays of electrochromic devices. These may include window dimming control systems, such as for the windows of passenger cabins of large commercial transport aircraft. In one embodiment, a control system uses existing wiring to distribute electronic control signals to the windows throughout the passenger cabin. By doing so, much of the weight and cost of wiring for the electrochromic devices are avoided.

Figure 11:
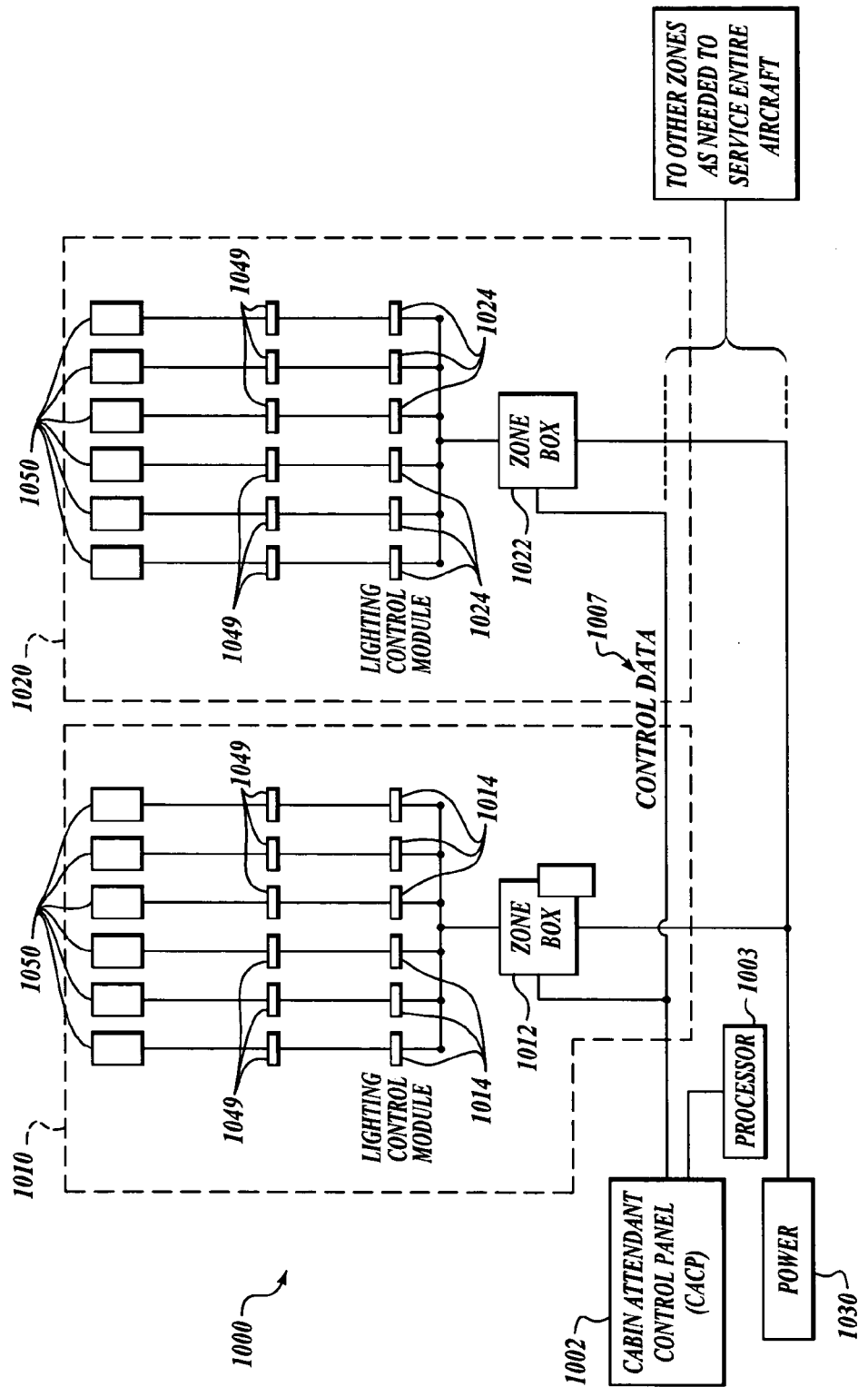
FIG. 11 is a schematic view of a window dimming system.

FIG. 11 is a schematic view of a window dimming system 1000 in accordance with another embodiment of the present invention. In this embodiment, the window dimming system 1000 includes at least one cabin attendant control panel 1002 operatively coupled to a first zone 1010 and a second zone 1020. Each zone 1010 and 1020 includes a zone control box 1012 and 1022, respectively, operatively coupled to the cabin attendant control panel 1002 and to a power source 1030. Also, each of the first and second zones 1010 and 1020 includes a plurality of lighting control modules 1014 and 1024 respectively, which are in turn operatively coupled to a plurality of passenger control panels 1049. The passenger control panels 1049 are separately connected to an associated electrochromic device 1050.

Although FIG. 11 depicts the cabin attendant control panel 1002 and the passenger control panels 1049 as being coupled to the electrochromic devices 1050 via conductive members (e.g. wires), in alternate embodiments, the control panels 1049, 1002 may be operatively coupled to the electrochromic devices 1050 in a wireless manner using, for example, radio signals or other electromagnetic signals. For example, the cabin attendant control panel 1002 suitably may be incorporated into a portable remote control unit carried by the attendant. Alternately, multi-way switching circuits may also be used, allowing a selection of electrochromic devices 1050 to control.

In operation, each of the passenger control modules 1049 may be adjustably controlled (e.g. by a passenger) to vary the color or opacity of its associated electrochromic device 1050, as described more fully below. Each zone control box 1012 and 1022 is adapted to receive control data 1003 from the cabin attendant control panel 1002, and responsible for relaying those control commands to the appropriate electrochromic device 1050. The passenger control modules 1049 may be controlled or overridden by the control data 1003 output from the cabin attendant control panel 1002, leaving the attendants in control of lighting, for example, for safety reasons.

In the embodiment shown in FIG. 11, one passenger control module 1049 is coupled to each electrochromic device 1050. This arrangement may be suitable, for example, for providing each window seat on the aircraft with a passenger control module 1049. In alternate embodiments, however, a plurality of passenger control modules 1049 may be coupled to each electrochromic device 1050, such as, for example, the other seats in the same row. In such alternate embodiments, a hierarchy of control authority may be established between the plurality of passenger control modules 1049, such as, for example, descending control authority with increasing distance from the respective window.

The window dimming control system 1000 advantageously provides improved control authority over the opacity of the plurality of electrochromic devices 1050. For example, in one mode of operation, each passenger within a cabin of the commercial aircraft may be permitted to control the opacity of his or her electrochromic device 1050, and thus, the tint, color, or transparency of his or her window, using the associated passenger control module 1049. In an alternate mode of operation, however, a cabin attendant or other authorized person may be permitted to override the settings of the individual passengers using the cabin attendant control panel 1002 as necessary (e.g. during an in-flight movie, during takeoff and landing, etc.) to control the uniformity of the lighting within the passenger cabin.

The cabin attendant control panel 1002 may be adapted to provide control authority over the electrochromic devices 1050 in a wide variety of ways. For example, the cabin attendant control panel 1002 may address one, several, all, or any other desired combination of the electrochromic devices 1050. The control panel 1002 may be programmable or include control options to be selected for the situation. The cabin attendant control panel may include or be linked to a computer processor 1007 providing for computerized or automated control of the electrochromic devices 1050. For example, in one particular embodiment, the cabin attendant control panel 1002 through the processor 1007 may be programmed to change the opacity of all electrochromic devices 1050 to change the environment based upon time of day, the status of the flight (take-off, landing, etc.), or other criteria. Alternately, the control panel 1002 might be programmed to change state automatically when a sufficient amount of light is sensed within the cabin. On the other hand, the attendant may utilize the cabin attendant control panel 1002 to override the passenger control modules 1049 of a particular passenger (e.g. a particular window seat) or a selected group of passengers (e.g. a selected group of window seats) as necessary for a desired lighting condition.

In one representative embodiment, the window dimming system 1000 is operated by means of the lighting control modules 1014 and 1024 and the cabin attendant control panel 1002 (via the first and second zone boxes 1012 and 1022) which are adapted to controllably vary the polarity and strength of electric fields powered by the power source 1030. By positioning the electrochromic devices 1050 adjacent the windows of the aircraft, the opacity of the electrochromic devices 1050 may be controllably varied to lighten or darken the windows of the aircraft.

The electrochromic device 1050 may assume a wide variety of embodiments and including those other than described above and shown in FIGS. 1 and 2A. The invention described above with reference to FIG. 11 should not be construed to being limited to any particular electrochromic device 1050, and indeed may be utilized with any electrically controlled shade. Furthermore, in alternate embodiments, electrochromic devices in accordance with the present invention need not be coupled to a surrounding structure (e.g. the aircraft fuselage 280 in FIG. 1). More specifically, in alternate embodiments, the electrochromic devices may be freestanding units.

Figure 12:
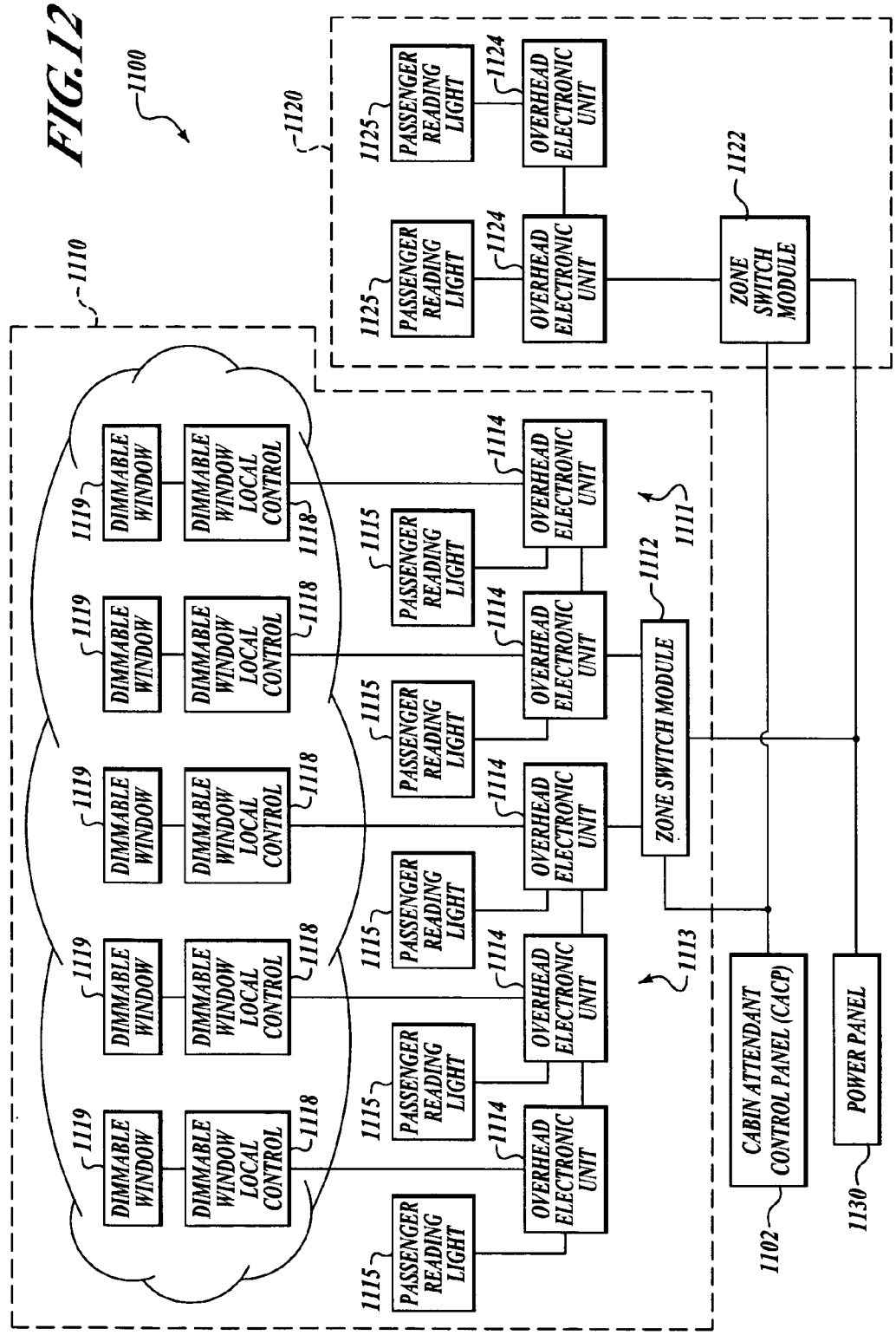
FIG. 12 is a schematic view of an alternate window dimming system.

In FIG. 12, a window dimming system 1100 includes a cabin attendant control panel 1102 operatively coupled to a first zone 1110 and a second zone 1120. Each zone includes a zone switch module 1112, 1122 operatively coupled to the cabin attendant control panel 1102 and to a power source 1130. In this embodiment, the zone switch module 1112 controls first and second sub-portions 1111 and 1113 of the first zone 1110, while the zone switch module 1124 controls the entire second zone 1120. Also, each of the first and second zones 1110 and 1120 includes a plurality of overhead electronic units 1114 and 1124, respectively, which are, in turn, each operatively coupled to associated passenger reading lights 1115 and 1125, respectively. The first zone 1110 further includes a plurality of dimmer controls 1118 operatively coupled to the overhead electronic units 1114 and to an associated electrochromic dimmable window 1119. The passenger dimmer controls 1118 are located conveniently for the passengers on each seat or row of seats on the armrests, tray tables, seat backs, or interior panels.

In operation, each of the dimmable windows 1119 of the first zone 1110 may be adjustably controlled independently of the other dimmable windows 1119 using the associated dimmer control 1118. Alternately, all of the dimmable windows 1119 may be controlled using the cabin attendant control panel 1102. The cabin attendant control panel 1102 may have override authority over each of the individual dimmer controls 1118, and is adapted to simultaneously adjust the electric fields within the plurality of dimmable windows 1119 of the first and second zones 1110, 1120 to selectively activate and de-activate the plurality of dimmable windows 1119 of the first and second zones 1110, 1120 either independently or in unison (or both).

The window dimming control system 1100 advantageously utilizes existing wiring to distribute the desired electronic control signals to the dimmable windows 1120 throughout the passenger cabin of the aircraft. In this way, much of the weight and cost of wiring that would otherwise be dedicated to this task is reduced or eliminated. In one particular embodiment, for example, the dimmer controls 1118 and the associated dimmable windows 1119 are simply incorporated into an existing Cabin Services System (CSS) that controls other functions within the main passenger cabin, including, for example, the reading lights associated with each passenger seat.

A wide variety of apparatus may be conceived that include electrochromic device array control systems in accordance with alternate embodiments of the present invention. For example, FIG. 13 is a side elevational view of an aircraft 1200 having a plurality of window assemblies 1201 and one or more window dimming control systems 1202 formed in accordance with alternate embodiments of the present invention.

In general, except for the window dimming control systems 1202 formed in accordance with the present invention, the various components and subsystems of the aircraft 1200 may be of known construction and, for the sake of brevity, will not be described in detail. Embodiments of window dimming control systems 1202 in accordance with the present invention, including but not limited to those embodiments described above and shown in FIGS. 11-12, may be employed in any desired location throughout the aircraft 1200.

Figure 13:
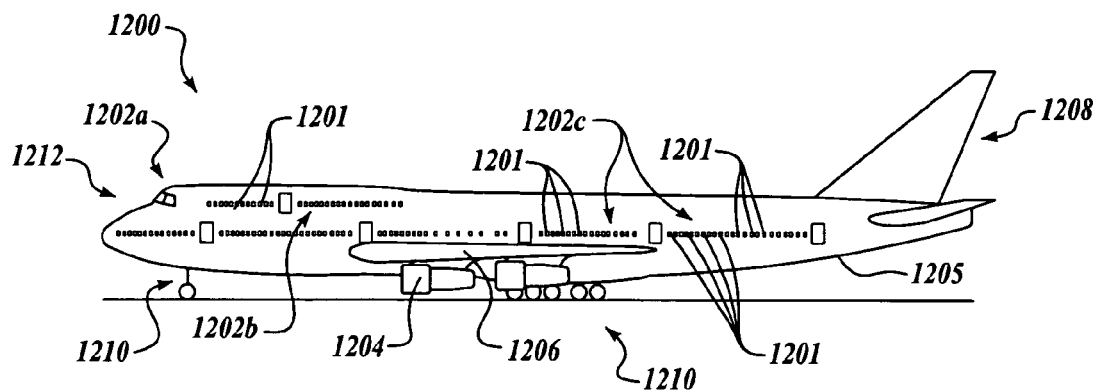
FIG. 13 is a side elevational view of an aircraft in accordance with an alternate embodiment of the present invention.

More specifically, as shown in FIG. 13, the aircraft 1200 includes one or more propulsion units 1204 coupled to an airframe (not visible) disposed within a fuselage 1205, wing assemblies 1206 (or other lifting surfaces), a tail assembly 1208, a landing assembly 1210, a control system (not visible) 1212, and a host of other systems and subsystems that enable proper operation of the aircraft 1200. A plurality of window assemblies 1201 are distributed throughout the fuselage 1205, and a plurality of window dimming control systems 1202 in accordance with the present invention are distributed throughout the various portions of the aircraft 1200, including, for example, within the cockpit (1202a), the first-class section (1202c), and the coach or business class section (1202c).

Although the aircraft 1200 shown in FIG. 11 is generally representative of a commercial passenger aircraft, including, for example, the 737, 747, 757, 767, 777, and 7E7 models commercially available from The Boeing Company of Chicago, Ill., the inventive apparatus and methods disclosed may also be employed in virtually any other types of aircraft. More specifically, the teachings of the present invention may be applied to other types and models of passenger aircraft, fighter aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. Alternate embodiments of apparatus and methods in accordance with the present invention may be used in the other applications, including, for example, ships, buses, trains, recreational vehicles, subways, monorails, houses, apartments, office buildings, or any other desired applications.

Figure 14:
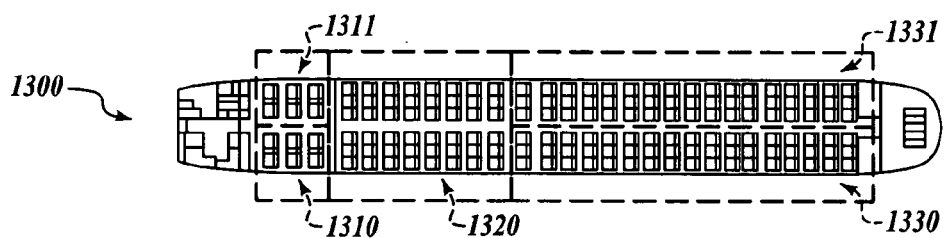
FIG. 14 shows a top elevational view of a representative passenger aircraft floor plan incorporating an embodiment of the present invention.

FIG. 14 shows a top elevational view of a representative passenger aircraft floor plan 1300. The passenger aircraft floor plan 1300 includes first port and starboard control systems 1310, 1311 covering port and starboard portions of the business section, a forward economy section control system 1320, and second port and starboard control systems 1330, 1331 covering the rear economy section. Each of the window control systems shown in FIG. 14 may include one or more zones such as described above with reference to FIGS. 11-12. Clearly, a wide variety of alternate embodiments of passenger aircraft floor plans 1300 having various configurations of window control systems in accordance with the present invention may be conceived.

Figure 15A:
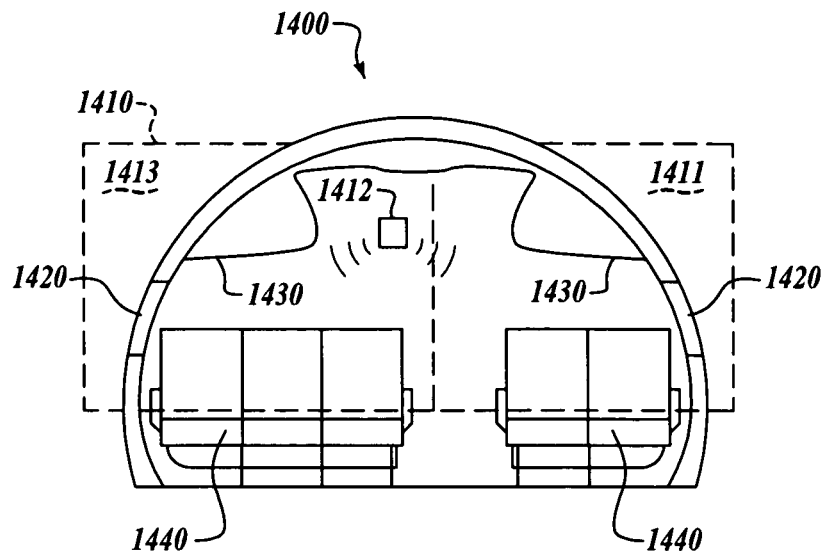
FIG. 15A shows an end cross-sectional view of a passenger aircraft section incorporating an embodiment of the present invention.
Figure 15B:
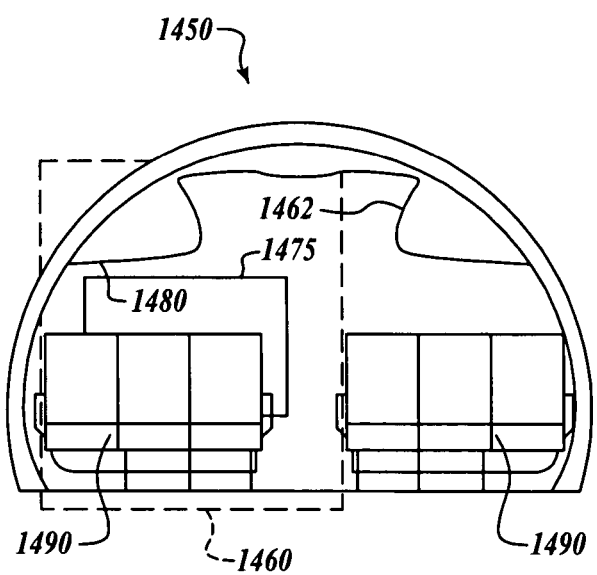
FIG. 15B shows an end cross-sectional view of an alternate passenger aircraft section similar to FIG. 15B.

In FIG. 15A passenger aircraft section 1400 includes a window control system 1410 having a first or left zone 1411 and a second or right zone 1413. A master control module 1412 is wirelessly coupled to electrochromic devices 1420 of the window control system 1410. Passenger control modules 1430 are positioned over the passenger seats 1440. As further shown in FIG. 15B, in another embodiment, a passenger aircraft section 1450 includes a control system 1460 adapted to control a freestanding electrochromic display or partition 1475. A master control module 1462 is located overhead in the aircraft section 1450. One or more passenger control modules 1480 may be located proximate the seats 1490, including, for example, within the armrests between the adjacent seats 1490, or on upper and lateral portions of the aircraft section 1450. Similarly, the master control module 1462 may be disposed in any desired location.

Figure 16:
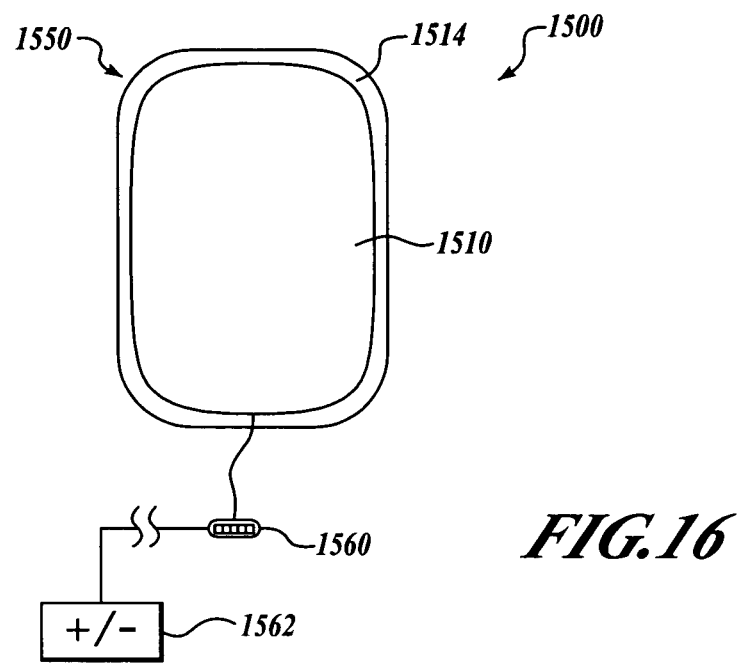
FIG. 16 is a front elevational view of a window assembly incorporating an electrochromic device.
Figure 17:
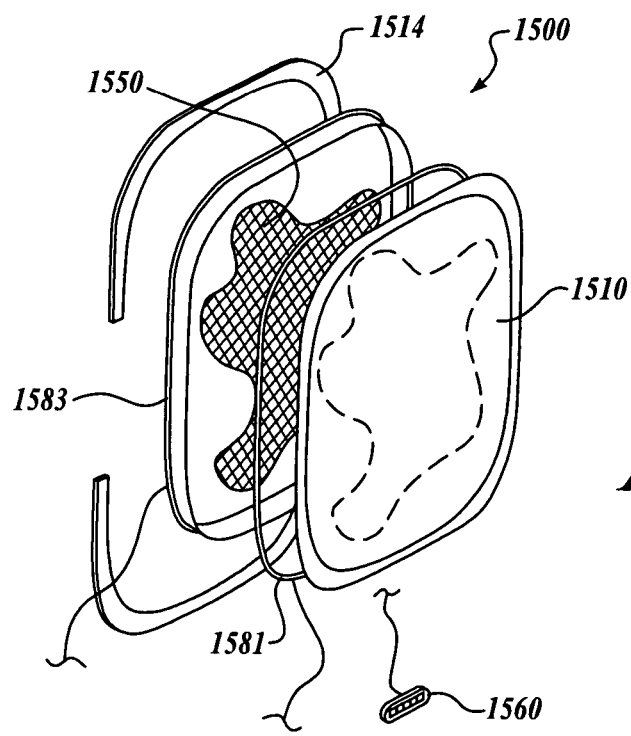
FIG. 17 is an exploded isometric view of the window assembly of FIG. 16.

As shown in FIG. 16 and FIG. 17, an exemplary window assembly 1500 includes a window member 1510, and an electrochromic assembly 1550 disposed adjacent the window member 1510. A passenger control module 1560 is operatively coupled to the electrochromic assembly 1550. An edge trim 1514 is disposed about an outer perimeter of the window member 1510. A power source 1562 provides power to the window assembly 1500. Bus bars 1581 and 1583 around the perimeter of the electrochromic assembly 1550 provide electrical connections to the assembly 1550.

Figure 18:
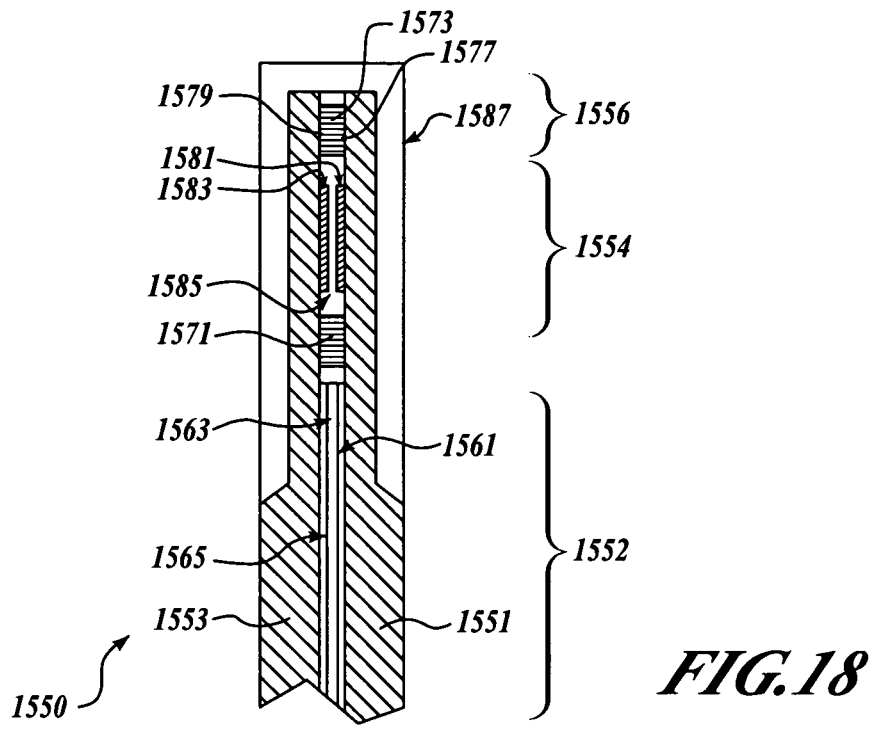
FIG. 18 is a partial cross-sectional view of the window assembly FIG. 16.

FIG. 18 is a detailed cross sectional view of an outer perimeter of the electrochromic device 1550 of FIG. 16. The device 1550 includes two outer transparent layers, a first outer layer 1551 and a second outer layer 1553 proximate to each other. The outer layers 1551 and 1553 by way of example may include glass, acrylic, or polycarbonate. The outer layers 1551 and 1553 are coated on their interior surfaces by a first transparent electrode coating 1577 and a second transparent electrode coating 1579, respectively. In a central portion 1552 of the first outer layer 1551, an electrochromic layer 1561 is deposited on the first electrode coating 1577. In a central portion 1552 of the second outer layer 1553, a counter-electrode grid 1565 is deposited on the second electrode coating 1579. Between the counter-electrode grid 1565 and the electrochromic layer 1561 is a layer of gel electrolyte 1563.

Attached to an edge portion 1554 of the first electrode coating 1571 is a first busbar 1581. As shown in FIG. 17, the first busbar 1581 suitably spans the circumference of the first outer layer 1551, providing an electrical connection to the first transparent electrode coating 1577. Attached to an edge portion 1554 of the second electrode coating 1579 is a second busbar 1583, that as shown in FIG. 17 suitably spans the circumference of the second outer layer 1553, providing an electrical connection to the second transparent electrode coating 1579. The first busbar 1581 and the second busbar 1583 suitably may be any conductor, including by way of example copper strips. A space 1585 is maintained between the first busbar 1581 and the second busbar 1583, so that charges may be provided to their respective electrode layers 1577 and 1579, without the first busbar 1581 and second busbar 1583 making contact with each other. The space 1585 may also hold or be filled with a dielectric, providing insulation between the busbars 1581 and 1582. A first adhesive seal 1571 between the first outer layer 1551 and second outer layer 1553, between their central portions 1552 and their edge portions 1554, suitably seals and contains the edge of the electrochromic layer 1561, the electrolyte 1563, and the counter electrode grid 1565, permitting the device to activate and deactivate when an electric charge is applied to the device 1550 through a power source (not shown) electrically coupled with the busbars 1581 and 1583. A second adhesive seal 1573 seals the outermost edge 1556 of the first outer layer 1551 and second outer layer 1553, suitably isolating and insulating the busbars 1581 and 1583 from the outside environment. Further, the edge portion 1554 and the outermost edge 1556 of the first outer layer 1551 and the second outer layer 1553 are surrounded by an edge trim 1587. The edge trim 1587 in this embodiment is in the form of a clip assisting in holding together the components of the device 1550, including the first outer layer 1551 and the second outer layer 1553, with the electrode layers 1577 and 1579, the electrochromic layer 1561, the electrolyte 1563, the counter electrode grid 1565, the two busbars 1581 and 1583 in a fixed configuration between them.

Figure 19:
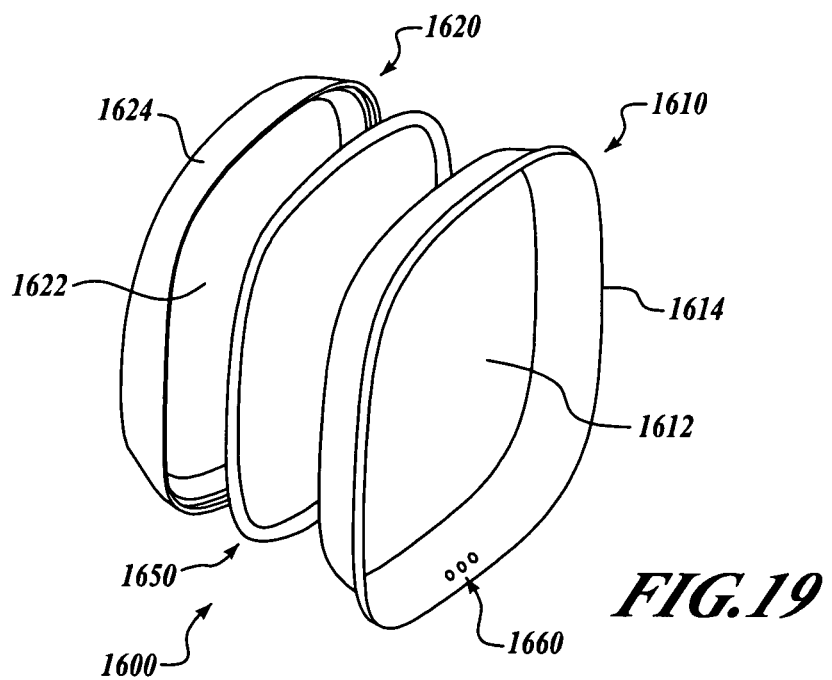
FIG. 19 is an exploded isometric view of another window assembly that includes an electrochromic device.

FIG. 19 is an exploded isometric view of a window assembly 1600 including a first window member 1610 having a transparent portion 1612 and an edge trim portion 1614. Similarly, an outer second window member 1620 includes a transparent portion 1622 and a mounting portion 1624. An electrochromic assembly 1650 is disposed between the first and second window members 1610, 1620. Passenger controls 1660 are disposed within the edge trim portion 1614 of the first window member 1610, in this example the inner window member for an aircraft, and are operatively coupled to the electrochromic assembly 1650. The passenger controls 1660, for example, allow the passenger in the window seat to control the electrochromic assembly 1650 as desired, subject to override signals from a master controller (not shown) as described with reference to FIGS. 11 and 12.

While preferred and alternate embodiments of the invention have been illustrated and described, as noted above, many changes may be made without departing from the spirit and scope of the invention. Accordingly, the scope of the invention is not limited by the disclosure of the preferred and alternate embodiments. Instead, the invention should be determined entirely by reference to the claims that follow:

What is claimed is:

1. An electrolyte for transmitting ions for an electrochromic device, the electrolyte comprising:
    a solvent including propylene carbonate, and from 60% to 90% by weight of gamma-butyrolactone; and
    at least one salt, wherein the at least one salt includes lithium trifluorosulfonimide.

2. The electrolyte of claim 1, wherein the electrolyte further comprises a polymer matrix.

3. The electrolyte of claim 2, wherein the polymer matrix includes polymethylmethacrylate.

4. The electrolyte of claim 2, wherein the at least one salt includes lithium perchlorate.

5. The electrolyte of claim 1, wherein the at least one salt further includes lithium perchlorate.

6. An electrochromic device comprising:
    a first electrode sheet, the first electrode sheet being substantially transparent;
    a second electrode sheet, the second electrode sheet being substantially transparent;
    an electrochromic polymer layer disposed between the first electrode sheet and the second electrode sheet; and
    a gel electrolyte disposed between the electrochromic polymer layer and one of the first electrode sheet and the second electrode sheet, the gel electrolyte including lithium trifluorosulfonimide and 60% to 90% by weight of gammabutyrolactone.

7. The electrochromic device of claim 6, wherein the gel electrolyte includes polymethylmethacrylate.

8. An aircraft comprising a fuselage and a window assembly in the fuselage, the window assembly including a frame adapted to hold the electrochromic device of claim 6.

9. An aircraft window comprising a frame adapted to hold the electrochromic device of claim 6, wherein the first electrode sheet, the second electrode sheet, the electrochromic polymer layer, and the gel electrolyte function as a window shade for an aircraft window.

10. The electrochromic device of claim 6, wherein the electrochromic layer includes a plurality of pigments.

11. The electrochromic device of claim 6, wherein the gel electrolyte includes approximately 70% by weight of gamma-butyrolactone, 20% by weight propylene carbonate, 3% by weight lithium perchlorate, and 7% by weight polymethylmethacrylate.

12. An electrochromic device, comprising:
    an electrolyte having propylene carbonate, and trifluorosulfonimide dissolved in an effective amount of gamma-butyrolactone, wherein the effective amount includes from 60% to 90% gamma-butyrolactone by weight, inclusive.

13. The electrochromic device of claim 12, wherein the effective amount includes from 65% to 75% gamma-butyrolactone by weight, inclusive.

14. The electrochromic device of claim 12, further comprising a plurality of pigments of electrochromic material.

15. The electrochromic device of claim 14, further comprising first and second electrode sheets disposed on opposing sides of the electrolyte.

16. The electrochromic device of claim 15, wherein at least one of the first and second electrode sheets comprises a tinted electrode sheet.

17. The electrochromic device of claim 14, wherein the electrolyte includes polymethylmethacrylate.

\* \* \* \* \*